March 7, 1944.  C. M. BLODGETT  2,343,525
CLAMPING SOCKET ATTACHMENT
Filed May 18, 1942
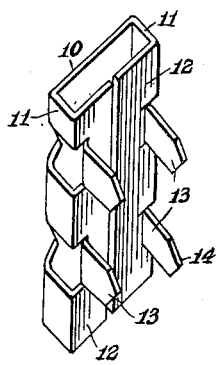
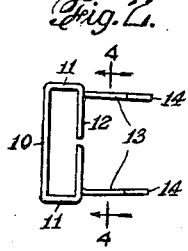
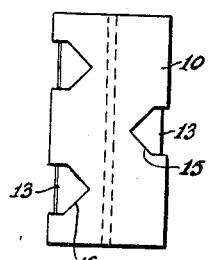
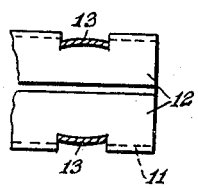
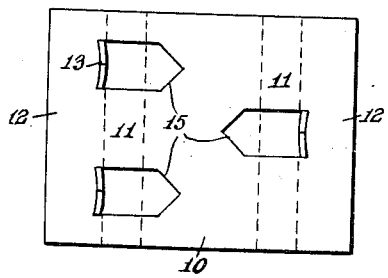
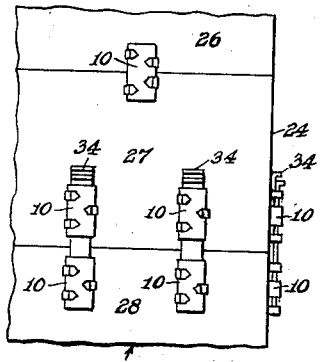
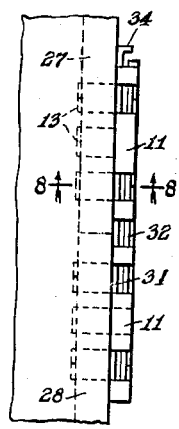
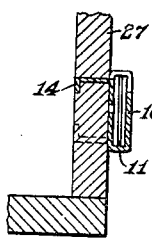
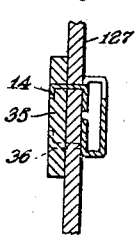
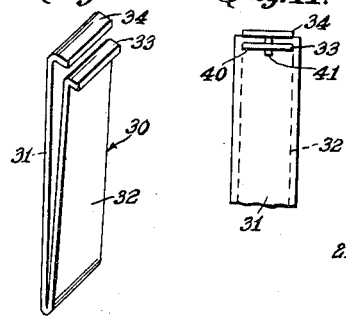
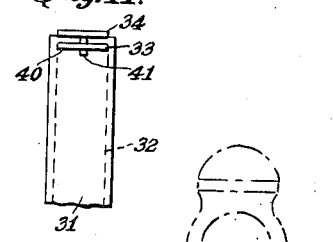
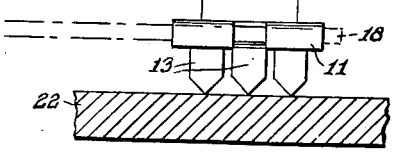
INVENTOR.
CLARENCE M. BLODGETT
BY
ATTORNEY.

Patented Mar. 7, 1944

2,343,525

UNITED STATES PATENT OFFICE 2,343,525

CLAMPING SOCKET ATTACHMENT

Clarence M. Blodgett, New York, N. Y.

Application May 18, 1942, Serial No. 443,415

4 Claims. (Cl. 217—70)

This invention relates generally to means for joining articles, such as sheets of material, or members which include containers or parts thereof, and has particular reference to socket attachments of this type.

Especially does the sheet material herein referred to include fibrous material, that is to say wood or cardboard, and it is one of the objects of this invention to provide a socket attachment of a clamping nature which, after an inspection of the same, may be deemed a device of simplified construction and one which may be readily attached to a sheet element for the specified purpose.

Heretofore receptacles constructed of the above indicated fibrous material, or parts of such receptacles, have been joined by metal plates, in which have been provided keepers or strip projections, and in the keepers have been inserted bolts or slide bars. In the metal plates have been screws or fastening elements, all demanding considerable use of metal, and it is an important object of this invention to provide a socket attachment which, together with other specified advantages, may result in considerable saving of such metal.

Containers and receptacles of the kind here indicated are used for military and other purposes, and it is another object of this invention, connected with the foregoing, to provide joining means for receptacles or parts thereof which are of light weight, inexpensive to construct, and of a permanent nature.

Since the instant attachment is relatively light, while strong, a feature of the device resides in rigidifying means, which latter are integral with the socket, and yet another of the objects at present involved includes that of a method of attachment. For this latter purpose, one or more tools may be used.

With the above indicated objects and advantages in view, as well as others which will hereinafter appear, the invention resides in certain novel constructions and arrangements, the essential features of which are herein clearly described, and illustrated in the accompanying drawing, in which:

Fig. 1 is a view in perspective of a clamping socket attachment constructed in accordance with the present invention;

Fig. 2 is an end view thereof;

Fig. 3 is a front elevation;

Fig. 4 is a section on the line 4—4 of Fig. 2.

Fig. 5 is a plan view of a blank of sheet metal stock out of which prongs are struck, this view showing the blank otherwise in flat condition, before being turned into the finished socket.

Fig. 6 is an elevational view of receptacle structures with which the instant device is incorporated.

Fig. 7 is an enlarged view of parts of Fig. 6.

Fig. 8 is a section on the line 8—8 of Fig. 7.

Fig. 9 is a view partly like that of Fig. 8, but showing a change of arrangement.

Fig. 10 is a view in perspective of spring locking member.

Fig. 11 is a fragmentary view in which a portion of a spring locking member appears, and Fig. 12 is a view illustrating an attaching operation.

In said drawing is shown a socket, referring first to Fig. 1 having a front wall 10, side walls 11, each substantially alike, and a back wall of two sections 12, also substantially alike.

In said Fig. 1 a number of prongs 13 are shown, in this case four, but other numbers of prongs may also be used on the attaching socket, three prongs being seen in Fig. 3, and it being understood that one prong, or preferably two prongs on one socket, are sufficient to bring about a complete and efficient result.

The prongs 13 are struck out of the sheet metal stock and these prongs are formed of arcuate cross section, with the concave side innermost as shown in Fig. 4, for example. By thus forming the prongs 13 their strength is materially increased, said prongs having a bayonet-like action in piercing any article or sheet into which they are driven. By thus curving the prongs 13, in cross section, the direction in which the points 14 thereof turn, on passing through a sheet, is determined. Said points accordingly turn inwardly and are permanently clenched, as on meeting any dolly, or suitable anvil base or backing.

The prongs 13 may be of any required length, depending upon the depth of sheeting or article into which they are to be driven, and in the particular length of prongs herein shown their point portions 14 are struck out of a front wall 10, as at 15; their medial or major portions out of the walls 11. In some cases, the prongs, when not of great length, may be formed entirely out of the walls 11.

Since these prongs are turned at their base portions from the outer margins of the sections 12, thus bringing said prongs substantially under the plane of the vertical wall portions 11, this arrangement also tends to strengthen the prongs while being driven into any article, said wall portions being in effect aligned with or continuations of the prongs.

Hereinbefore receptacles for military use have been mentioned, although the present attachments are not limited to any one or particular use, but a rapid and efficient method of affixing said attachments to any article is herein disclosed, it being noted that said attachments, with their prongs have a hollow body of rectangular internal cross section.

A gig member, tool, holder or carrier is also shown, and this member at its front end 18 is also of rectangular cross section and of such dimensions as to releasably slidably fit into the hollow body 10—12. A handle 20 is another part of said gig, and with it when an operator grasps the handle 20 in one hand, and with a weight, implement or hammer 21 having a handle 23 in the other hand, the aforesaid rapid action is performed.

Thus, the end 18 is placed in the hollow of said body, to lift and carry it, then as in Fig. 12 the teeth or prongs 13 are placed on an article 22, and the hammer 23 used, as indicated to attach the socket, whereupon the gig 18, 20 is withdrawn, and the practice continued.

This article or container wall 22 may be of wood, for example, and deeper than the length of the teeth 13, so that no clenching is required. The end 18 therefore serves multiple purposes, as indicated, one of which is to prevent mutilation or distortion of the above socket body.

In this disclosure are conventionally shown receptacles 24, 25, having walls 26, 27, and a wall 28. A socket having a front wall 10, in this case, with four prongs, as aforesaid, has two prongs driven into a wall, board or member 26, and two prongs driven into a wall 27. This socket or clamping attachment therefore of itself brings about a complete result, as seen in Fig. 6.

In the figure last mentioned are two containers, as stated, and on a member 27 of one of these containers is attached one clamp 10, and below this clamp 10, on the other container wall 28 is another clamp 10.

The two coacting sockets having the walls 10, as of Fig. 6, have in connecting relation therewith a locking element 30, having a leg 31 and a relatively springable leg 32. On the leg 32 is a ledge 33 or stop and on the leg 31 a ledge or fingerpiece 34. Therefore the boxes 24 and 25 are releasably locked or fastened together, which is another example of the attaching function secured, and yet others are referred to herein. A locking piece 30 may be formed without a fingerpiece 34, and then the device is of a more permanent nature, since the member 30 cannot so easily be removed.

A wall member 127, shown in Fig. 9, is relatively thin and this wall has therein a backing 35, which may be of sheet metal. When the backing 35 is constructed of metal, as in this case, it is provided with slots, as at 36, to receive the prongs 13 of the attachment.

In the showing of Fig. 6, where one socket member has prongs in each of two sheets 26, 27, a backing like the backing 35 may be used, although such backing may be material other than metal, such as cardboard, corrugated or otherwise.

Fig. 11 shows a modified locking arrangement, and in this case the wall 10 of the socket has therein a cross slot 40. Into the slot 40 is pressed and snapped the ledge 33 of the leg 32, making the coacting members apparently nearly impossible of separation.

However, there is a vertical slot having a lower portion 41 in the wall 10, and an upper aligned top slot portion, as shown. Then on pressing the leg 32 through the slot part 41, with any proper pin or article, a person may unlock the members by urging upwardly on the ledge 33 and allowing the pin to pass through the upper part of said slot.

I claim:

1. A holding means for containers of penetrable material comprising a socket having penetrating prongs for attachment to a lowermost container, a second socket substantially like the first socket for attachment to an upper container in alignment with the first socket, the socket of the upper container having in its upper portion a slot, and a joining member for said sockets, said member having integral spring constructed legs including a lower portion for entering the lower socket, one leg having above the upper socket a manipulating flange, and a second leg of said member having a flange slightly below the first flange, whereby the second flange may holdingly snap into said slot.

2. A holding means for upper and lower containers of penetrable material, comprising a one piece sheet metal socket having prongs for attachment to the lower container, a second socket substantially like the first socket for attachment to the upper container, the socket of the upper container having in its uppermost portion a transverse slot and a vertical marginal slot communicating with the transverse slot, and a joining member for said sockets, said member having integral spring constructed legs with lower portions for entering the lower socket, one leg having above the upper socket a manipulating flange, and a second leg of said member having a flange slightly below the first flange, whereby the lower flange may holdingly snap into the transverse slot.

3. A rectangular blank of sheet metal formed into a box-like attachment for penetrable sheet material, the blank including attaching prongs of considerable length, said blank having a section forming a front wall of the attachment, the latter having open ends, narrow sections forming opposed side walls and being bent into positions at right angles to the front wall, and two sections turned inwardly from said side wall sections and forming a back wall, the edges of the back wall sections being adjoined, the prongs being directed rearwardly from the back wall, said prongs having their main portions formed out of the sidewall sections, the points of the prongs being formed out of portions of said front wall section.

4. A box-like attachment for a receptacle of penetrable material, said attachment formed from a rectangular blank of sheet metal including attaching prongs and having a section forming a front wall, the attachment having open ends, relatively narrow sections forming opposed side walls and being bent into positions at right angles to the front wall, and two sections turned inwardly from said side wall sections and forming a back wall, said prongs being directed rearwardly from the back wall, the material of said prongs being struck substantially out of said side wall sections, as and for the purpose set forth.

CLARENCE M. BLODGETT.